UNITED STATES PATENT OFFICE.

MARCUS GUGGENHEIM, OF BASEL, AND ERNST HUG, OF RIEHEN, NEAR BASEL, SWITZERLAND, ASSIGNORS TO THE HOFFMANN-LA ROCHE CHEMICAL WORKS, OF NEW YORK, N. Y., A CORPORATION OF NEW YORK.

PROCESS FOR MAKING ETHANOL-TRIALKYL-ARSONIUM HYDROXIDS.

1,308,413.   Specification of Letters Patent.   Patented July 1, 1919.

No Drawing.   Application filed December 6, 1916.   Serial No. 135,354.

*To all whom it may concern:*

Be it known that we, MARCUS GUGGENHEIM, residing at Basel, Switzerland, and ERNST HUG, residing at Riehen, near Basel, Switzerland, both citizens of Switzerland, have invented a certain new and Improved Process for Making Ethanol-Trialkyl-Arsonium Hydroxids, of which the following is a specification.

This invention relates to a process for making ethanol-trialkyl-arsonium-hydroxids, and consists mainly in hydrolyzing the halogen salts of halogen-ethyl-trialkyl-arsoniums.

The ethanol-trialkyl-arsonium-hydroxids and their salts are intended to be used for therapeutical purposes.

We proceed as follows:—

The bromethyl-trimethyl-arsonium bromid which is a halogen salt of a halogen-ethyl-trialkyl-arsonium is prepared in the following manner:

5 parts of trimethyl-arsin ($As\equiv(CH_3)_3$), 7.5 parts of symmetric di-bromethane ($CH_2Br=CH_2Br$) are heated for three hours at a temperature of 100° C., and the product, bromethyl-trimethyl-arsonium bromid ($C_2H_4BrAs(CH_3)_3Br$) is thereupon purified by crystallization from alcohol solution; it forms beautiful prismatic crystals, having a melting point of 239° C. is readily soluble in cold water and in hot alcohol, but only slightly soluble in cold alcohol.

We now take 3 parts of bromethyl-trimethyl-arsonium bromid and hydrolyze same with 10 parts of water at a temperature of 180° C. for four hours more or less. The resulting ethanol-trimethyl-arsonium-bromin ($C_2H_4OHAs(CH_3)_3Br$) is next taken up with alcohol and precipitated out of this alcoholic solution with ether. The free base, ethanol-trimethyl-arsonium-hydroxid ($C_2H_4OHAs(CH_3)_3OH$) can be obtained therefrom by the action of silver oxid.

To prepare bromethyl-triethyl-arsonium-bromid we proceed as follows:—

13 parts of triethyl-arsin ($As\equiv(C_2H_5)_3$), 15 parts of symmetric di-bromethane ($CH_2Br=CH_2Br$) are allowed to act upon each other for three hours at a temperature of 100° C. By crystallization from alcohol the bromethyl-triethyl-arsonium-bromid ($C_2H_4BrAs(C_2H_5)_3Br$) can be obtained in beautiful prismatic crystals, melting point 225° C., easily soluble in cold water and hot alcohol but not so easily soluble in cold alcohol.

4 parts bromethyl-triethyl-arsonium-bromid ($C_2H_4BrAs(C_2H_5)_3Br$) are then hydrolyzed with 10 parts of water at a temperature of 180° C. for four hours. The ethanol-triethyl-arsonium-bromid so obtained is taken up with amyl alcohol and then precipitated by adding ether to the alcoholic solution; from this ethanol-triethyl-arsonium-bromid ($C_2H_4OHAs(C_2H_5)_3Br$) the free base ethanol-triethyl-arsonium-hydroxid ($C_2H_4OHAs(C_2H_5)_3OH$) can be obtained by the action of silver oxid.

The product ethanol-trimethyl-arsonium-hydroxid ($C_2H_4OHAs(CH_3)_3OH$) is a syrup-like substance which partially crystallizes and has an odor resembling that of trimethyl-arsin; it is easily soluble in water and alcohol but insoluble in ether; it forms very characteristic salts with acids; the chlorid for instance forms beautiful crystals, melts at 220° C., is very hygroscopic, easily soluble in alcohol, insoluble in ether.

The ethanol-triethyl-arsonium-hydroxid ($C_2H_4OHAs(C_2H_5)_3OH$) shows qualities similar to those of the ethanol-trimethyl-arsonium-hydroxid just as the corresponding salts of the two bases are very much alike.

The product of this process is claimed by us in another application for patent which is filed on the same day as this, Serial No. 135,355.

In the same application we have claimed also the second and last step of the process above described, namely, the step of converting ethanol-trialkyl-asonium-halogenid into ethanol-trialkyl-arsonium-hydroxid by the action of silver oxid. In the present application the essential feature of the invention is the hydrolyzing with water of the halogen salts of halogen-ethyl-trialkyl-arsoniums.

We claim:

1. That step in the process of making ethanol-trialkyl-arsonium-hydroxid which consists in heating a halogen salt of halogen-ethyl-trialkyl-arsonium with water until an ethanol-trialkyl-arsonium-halogenid is formed, substantially as and for the purpose described.

2. The process of making ethanol-trialkyl-arsonium-hydroxid which comprises heating a halogen salt of halogen-ethyl-trialkyl-arsonium with water until an ethanol-trialkyl-arsonium-halogenid is formed and then treating said halogenid with silver oxid, substantially as and for the purpose described.

3. That step in the process of making ethanol-trimethyl-arsonium-hydroxid which consists in heating a halogen salt of halogen-ethyl-trimethyl-arsonium with water until ethanol-trimethyl-arsonium halogenid is formed, substantially as and for the purpose described.

4. The process of making ethanol-trimethyl-arsonium-hydroxid which comprises heating a halogen salt of halogen-ethyl-trimethyl-arsonium with water until an ethanol-trimethyl-arsonium-halogenid is formed, and then treating said halogenid with silver oxid, substantially as and for the purpose described.

5. That step in the process of making ethanol-trimethyl-arsonium-bromid which consists in heating brom-ethyl-trimethyl-arsonium-bromid with water until ethanol-trimethyl-arsonium-bromid is formed, substantially as and for the purpose described.

6. The process of making ethanol-trimethyl-arsonium-hydroxid which consists in heating brom-ethyl-trimethyl-arsonium-bromid with water until ethanol-trimethyl-arsonium-bromid is formed, and then treating said bromid with silver oxid, substantially as and for the purpose described.

In testimony whereof we have hereunto set our hands.

MARCUS GUGGENHEIM.
ERNST HUG.